United States Patent
Tang et al.

(10) Patent No.: US 10,690,999 B2
(45) Date of Patent: Jun. 23, 2020

(54) IMAGE CAPTURING MODULE AND LENS SHADE THEREOF

(71) Applicant: SZ DJI TECHNOLOGY CO., LTD., Shenzhen (CN)

(72) Inventors: Yin Tang, Shenzhen (CN); Feihu Yang, Shenzhen (CN); Hualiang Qiu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 336 days.

(21) Appl. No.: 15/613,229

(22) Filed: Jun. 4, 2017

(65) Prior Publication Data

US 2017/0269457 A1 Sep. 21, 2017

Related U.S. Application Data

(63) Continuation of application No. PCT/CN2014/092991, filed on Dec. 4, 2014.

(51) Int. Cl.
*G03B 11/04* (2006.01)
*G03B 15/00* (2006.01)

(52) U.S. Cl.
CPC ............ *G03B 11/043* (2013.01); *G03B 11/04* (2013.01); *G03B 15/006* (2013.01); *G03B 2217/002* (2013.01)

(58) Field of Classification Search
CPC .................. G03B 11/043; G03B 11/04; G03B 2217/002; G03B 11/045; G03B 11/06
USPC .................................. 359/611–613; 396/534
See application file for complete search history.

(56) References Cited

U.S. PATENT DOCUMENTS

| 4,137,540 A * | 1/1979 | Curtis .................... G03B 17/12 359/611 |
| 4,901,097 A | 2/1990 | Vandemoere et al. |
| 2004/0151492 A1 | 8/2004 | Blok et al. |
| 2013/0051784 A1* | 2/2013 | Chang .................. G03B 11/043 396/448 |

FOREIGN PATENT DOCUMENTS

| CN | 1673791 A | 9/2005 |
| CN | 201364449 Y | 12/2009 |

(Continued)

OTHER PUBLICATIONS

The World Intellectual Property Organization (WIPO) International Search Report for PCT/CN2014/092991 dated Jul. 1, 2015 8 Pages.

*Primary Examiner* — Kristina M Deherrera
(74) *Attorney, Agent, or Firm* — Anova Law Group, PLLC (57) ABSTRACT

An image capturing module includes a casing, a lens component arranged in the casing, and a lens shade disposed directly facing the lens component and having a thin plate shape. The lens shade includes a first bottom surface close to the lens, a second bottom surface disposed opposite to the first bottom surface and away from the lens, a snap portion configured to snap the lens shade with the casing, and a light incoming pathway running through the lens shade to allow external light to enter the lens. The light incoming pathway includes a first light inlet formed at the first bottom surface and a second light inlet formed at the second bottom surface. A size of the second light inlet is greater than a size of the first light inlet.

17 Claims, 10 Drawing Sheets

(56) References Cited

FOREIGN PATENT DOCUMENTS

| | | |
|---|---|---|
| CN | 204256340 U | 4/2015 |
| JP | H04301628 A | 10/1992 |
| JP | 2002040310 A | 2/2002 |
| JP | 2004279869 A | 10/2004 |
| JP | 2006145955 A | 6/2006 |
| JP | 2008205973 A | 9/2008 |
| JP | 2013217979 A | 10/2013 |

* cited by examiner

IMAGE CAPTURING MODULE AND LENS SHADE THEREOF

CROSS-REFERENCE TO RELATED APPLICATION

This is a continuation application of International Application No. PCT/CN2014/092991, filed on Dec. 4, 2014, the entire contents of which are incorporated herein by reference.

TECHNICAL FIELD

The present disclosure relates to an image capturing module and lens shade thereof.

BACKGROUND

A lens shade is a device mounted at the front end of a lens of an image capturing module, such as a photographic lens, a digital camera, a video camera, or the like, to block unwanted light. According to their materials, lens shades may be divided into, for example, metallic lens shades, hard plastic lens shades, and soft rubber lens shade. According to their shapes, lens shades may be divided into, for example, cylindrical lens shades, petal-shaped lens shades, and square lens shades.

Usually, a conventional lens shade may be added at the front end of an image capturing module, which causes a length and diameter of a lens of the image capturing module to increase. Such a conventional lens shade, when used on an ordinary digital camera or video camera, may reduce the interference of miscellaneous light to a certain extent.

However, for a sport-type photographic lens or a miniature photographic apparatus to be mounted on an unmanned aerial vehicle (UAV) to shoot in the air, a conventional lens shade may not be suitable due to its large volume and complicated installation. In addition, adding such a conventional lens shade at the front end of the miniature photographic apparatus that is to be mounted on an UAV to shoot in the air may change the center of gravity of the photographic apparatus, influencing the balance of the UAV and the stability of a multi-axis gimbal connecting the photographic apparatus to the UAV.

SUMMARY

The present disclosure provides a lens shade and an image capturing module with a built-in lens shade.

According to the present disclosure, there is provided a lens shade comprising a first bottom surface, a second bottom surface disposed opposite to the first bottom surface, a snap portion formed on an outer side surface of the lens shade, and a light incoming pathway running through the lens shade and comprising a first light inlet formed at the first bottom surface and a second light inlet formed at the second bottom surface. A size of the second inlet is greater than a size of the first light inlet. The lens shade has a thin plate shape.

In some embodiments, the lens shade has a discoid thin plate shape.

In some embodiments, the second light inlet has a rectangular or a circular shape.

In some embodiments, the first light inlet has a circular or a race-track shape.

In some embodiments, a sidewall of the light incoming pathway comprises a slant surface.

In some embodiments, the second light inlet has a rectangular shape, and a sidewall of the light incoming pathway comprises four slant surfaces extending from four lateral sides of the second light inlet towards the first light inlet.

In some embodiments, the lens shade further comprises a lens shade body and a bottom cover connected to a side of the lens shade body. The light incoming pathway runs through the lens shade body and the bottom cover. The first bottom surface comprises a bottom surface on the bottom cover. The second bottom surface comprises a bottom surface on the lens shade body.

In some embodiments, the lens shade forms a hollow casing. Another bottom surface on the lens shade body opposite to the second bottom surface comprises an opening hole. A size of the opening hole is greater than a size of the second light inlet.

In some embodiments, a shape and a size of the bottom cover match a shape and a size of the opening hole, respectively. The lens shade body comprises a first positioning portion and a first fastening portion formed at the opening hole. The bottom cover comprises a second positioning portion matching the first positioning portion and a second fastening portion matching the first fastening portion. The first positioning portion and the second positioning portion are configured to match each other to position the bottom cover, and the first fastening portion and the second fastening portion are configured to match each other to connect the bottom cover to the lens shade body.

In some embodiments, the first fastening portion comprises an elastic arm protruding from a portion on a sidewall of the lens shade body close to the opening hole, and the second fastening portion comprises a snap slot or a stepped surface formed on an outer sidewall of the bottom cover and matching the elastic arm.

In some embodiments, the first positioning portion comprises a notch disposed at the opening hole, and the second positioning portion comprises a protruding portion protruding from an outer sidewall of the bottom cover and matching the notch.

In some embodiments, the lens shade body comprises a first fastening portion, the bottom cover comprises a second fastening portion matching the first fastening portion, and the first fastening portion and the second fastening portion are configured to match each other to connect the bottom cover to the lens shade body.

In some embodiments, the first fastening portion comprises an elastic arm protruding from a sidewall of the lens shade body, and the second fastening portion comprises a snap slot or a stepped surface formed on an outer sidewall of the bottom cover and matching the elastic arm.

In some embodiments, the lens shade body comprises a first positioning portion, the bottom cover comprises a second positioning portion matching the first positioning portion, and the first positioning portion and the second positioning portion are configured to match each other to position the bottom cover.

In some embodiments, the first positioning portion comprises a notch formed on the lens shade body, and the second positioning portion comprises a protruding portion protruding from an outer sidewall of the bottom cover and matching the notch.

In some embodiments, the lens shade further comprises an annular retaining wall formed on the first bottom surface and being perpendicular to the first bottom surface.

Also in accordance with the present disclosure, there is provided an image capturing module comprising a casing, a lens component arranged in the casing, and a lens shade disposed directly facing the lens component and having a thin plate shape. The lens shade comprises a first bottom surface close to the lens, a second bottom surface disposed opposite to the first bottom surface and away from the lens, a snap portion configured to snap the lens shade with the lens casing, and a light incoming pathway running through the lens shade to allow external light to enter the lens, the light incoming pathway comprising a first light inlet formed at the first bottom surface and a second light inlet formed at the second bottom surface. A size of the second light inlet is greater than a size of the first light inlet.

In some embodiments, the lens shade has a discoid thin plate shape.

In some embodiments, the second light inlet has a rectangular or a circular shape.

In some embodiments, the first light inlet has a circular or a race-track shape.

In some embodiments, a sidewall of the light incoming pathway comprises a slant surface.

In some embodiments, the second light inlet has a rectangular shape, and a sidewall of the light incoming pathway comprises four slant surfaces extending from four lateral sides of the second light inlet towards the first light inlet.

In some embodiments, the lens shade further comprises an annular retaining wall formed on the first bottom surface and being perpendicular to the first bottom. The retaining wall matches the lens and is configured to limit a position of the lens.

In some embodiments, the lens shade comprises a lens shade body and a bottom cover connected to a side of the lens shade body close to the lens, the light incoming pathway runs through the lens shade body and the bottom cover, the first bottom surface comprises a bottom surface on the bottom cover close to the lens, and the second bottom surface comprises a bottom surface on the lens shade body away from the lens.

In some embodiments, the lens shade forms a hollow casing. Another bottom surface on the lens shade body close to the lens comprises an opening hole. A size of the opening hole is greater than a size of the second light inlet.

In some embodiments, a shape and a size of the bottom cover match a shape and a size of the opening hole, respectively. The lens shade body comprises a first positioning portion and a first fastening portion formed at the opening hole. The bottom cover comprises a second positioning portion matching the first positioning portion and a second fastening portion matching the first fastening portion. The first positioning portion and the second positioning portion are configured to match each other to position the bottom cover, and the first fastening portion and the second fastening portion are configured to match each other to connect the bottom cover to the lens shade body.

In some embodiments, the first fastening portion comprises an elastic arm protruding from a portion on a sidewall of the lens shade body close to the opening hole, and the second fastening portion comprises a snap slot or a stepped surface formed on an outer sidewall of the bottom cover and matching the elastic arm.

In some embodiments, the first positioning portion comprises a notch disposed at the opening hole, and the second positioning portion comprises a protruding portion protruding from an outer sidewall of the bottom cover and matching the notch.

In some embodiments, the lens shade body comprises a first fastening portion, the bottom cover comprises a second fastening portion matching the first fastening portion, and the first fastening portion and the second fastening portion are configured to match each other to connect the bottom cover to the lens shade body.

In some embodiments, the first fastening portion comprises an elastic arm protruding from a sidewall of the lens shade body, and the second fastening portion comprises a snap slot or a stepped surface formed on an outer sidewall of the bottom cover and matching the elastic arm.

In some embodiments, the lens shade body comprises a first positioning portion, the bottom cover comprises a second positioning portion matching the first positioning portion, and the first positioning portion and the second positioning portion are configured to match each other to position the bottom cover.

In some embodiments, the first positioning portion comprises a notch formed on the lens shade body, and the second positioning portion comprises a protruding portion protruding from an outer sidewall of the bottom cover and matching the notch.

In some embodiments, the bottom cover comprises an annular retaining wall formed on and perpendicular to the first bottom surface, the retaining wall matching the lens and being configured to limit a position of the lens.

In some embodiments, the casing comprises an opening for receiving the lens shade, the opening comprising a matching portion matching the snap portion to fix the lens shade on the casing.

In some embodiments, the snap portion comprises a snap slot, the matching portion comprises a protruding rib disposed on the opening and protruding from a bottom surface of the opening, and the protruding rib and the snap slot match each other to fix the lens shade on the casing. In some embodiments, the snap portion comprises a protruding rib, the matching portion comprises a snap slot provided on a bottom surface of the opening, and the protruding rib and the snap slot match each other to fix the lens shade on the casing.

In some embodiments, the image capturing module further comprises a filter component connected on the lens shade.

In some embodiments, the filter component is detachably connected to a side of the lens shade away from the lens.

In some embodiments, the filter component is connected with the lens shade by threads.

According to the present disclosure, a lens shade is disposed inside an image capturing module and in close proximity to a lens of the image capturing module. As such, the image capturing module can have a small volume and a simple structure, and at the same time a good shading performance. The image capturing module and the lens shade of the image capturing module in accordance with the present disclosure may be applicable to a sport camera device or a miniature camera mounted on an unmanned aerial vehicle for shooting in the air.

EXPLANATIONS OF REFERENCE NUMBERS
OF MAIN ELEMENTS

| image capturing module | 100、200 |
| --- | --- |
| upper casing | 11、211 |
| first opening portion | 112、2112 |
| lower casing | 12、212 |
| first threaded hole | 121 |
| second opening portion | 122、2122 |
| third threaded hole | 123 |
| matching portion | 13、213 |
| lens component | 20、220 |
| lens | 21、221 |
| second threaded hole | 201 |
| fourth threaded hole | 202 |
| lens shade | 30、230 |
| first bottom surface | 31、231 |
| second bottom surface | 32、232 |
| outer side surface | 33、233 |
| light incoming pathway | 34、234 |
| first light inlet | 341、2341 |
| second light inlet | 342、2342 |
| inner sidewall | 343、2343 |
| snap portion | 35、235 |
| first connecting portion | 36、236 |
| space | 237 |
| first fastening portion | 238 |
| opening hole | 239 |
| lens shade body | 23 |
| bottom cover | 24 |
| third bottom surface | 241 |
| fourth bottom surface | 242 |
| outer sidewall | 243 |
| second positioning portion | 244 |
| second fastening portion | 245 |
| through hole | 246 |
| first positioning portion | 25 |
| filter component | 40、240 |
| filter | 41、2041 |
| filter ring | 42、2042 |
| second connecting portion | 43 |
| screw | 50、70 |
| elastic gasket | 60、80、280 |

Embodiments of the present disclosure will be described in detail in connection with the above-described drawings.

DETAILED DESCRIPTION OF THE
EMBODIMENTS

Figure 1:
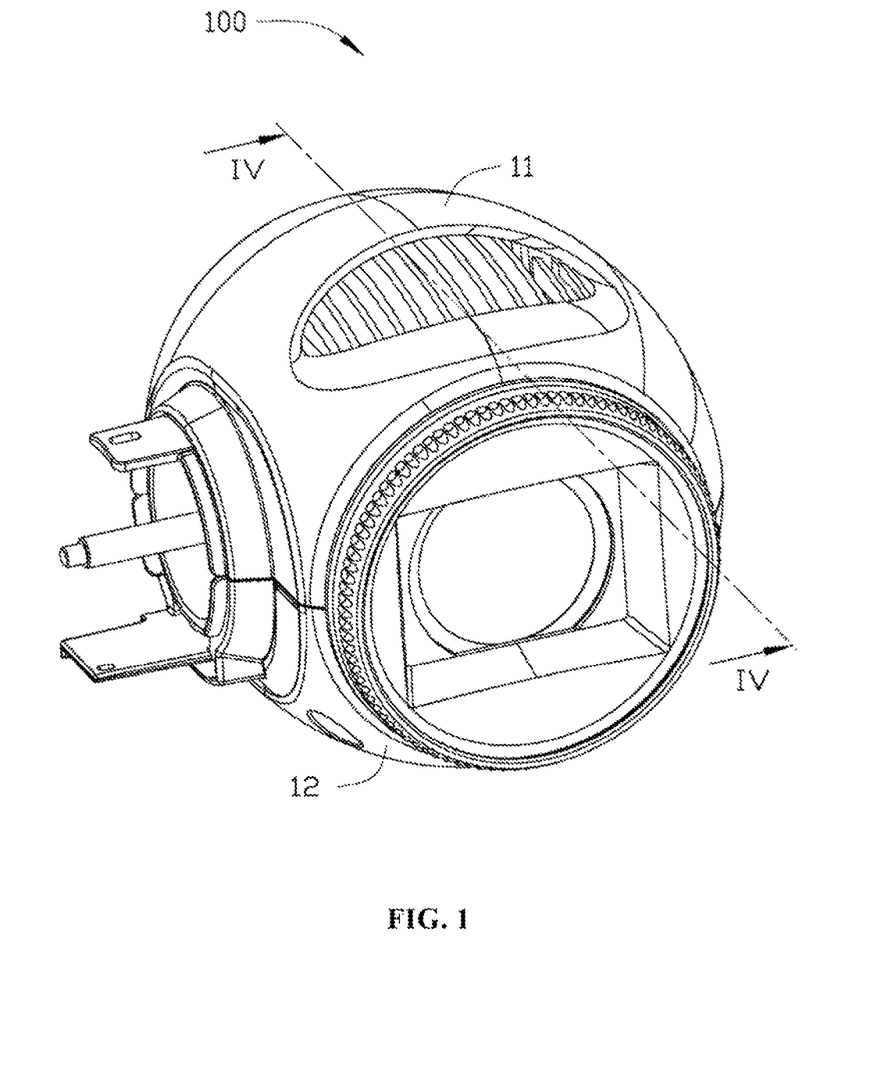
FIG. 1 is a structural schematic diagram of an image capturing module in accordance with an embodiment of the present disclosure.

FIG. 1 is a structural schematic diagram of an image capturing module 100 in accordance with an embodiment of the present disclosure. The image capturing module 100 may be a miniature camera for mounting on an unmanned aerial vehicle to shoot in the air, or may be a sport camera or an image capturing module of another digital camera or photographic apparatus.

Figure 2:
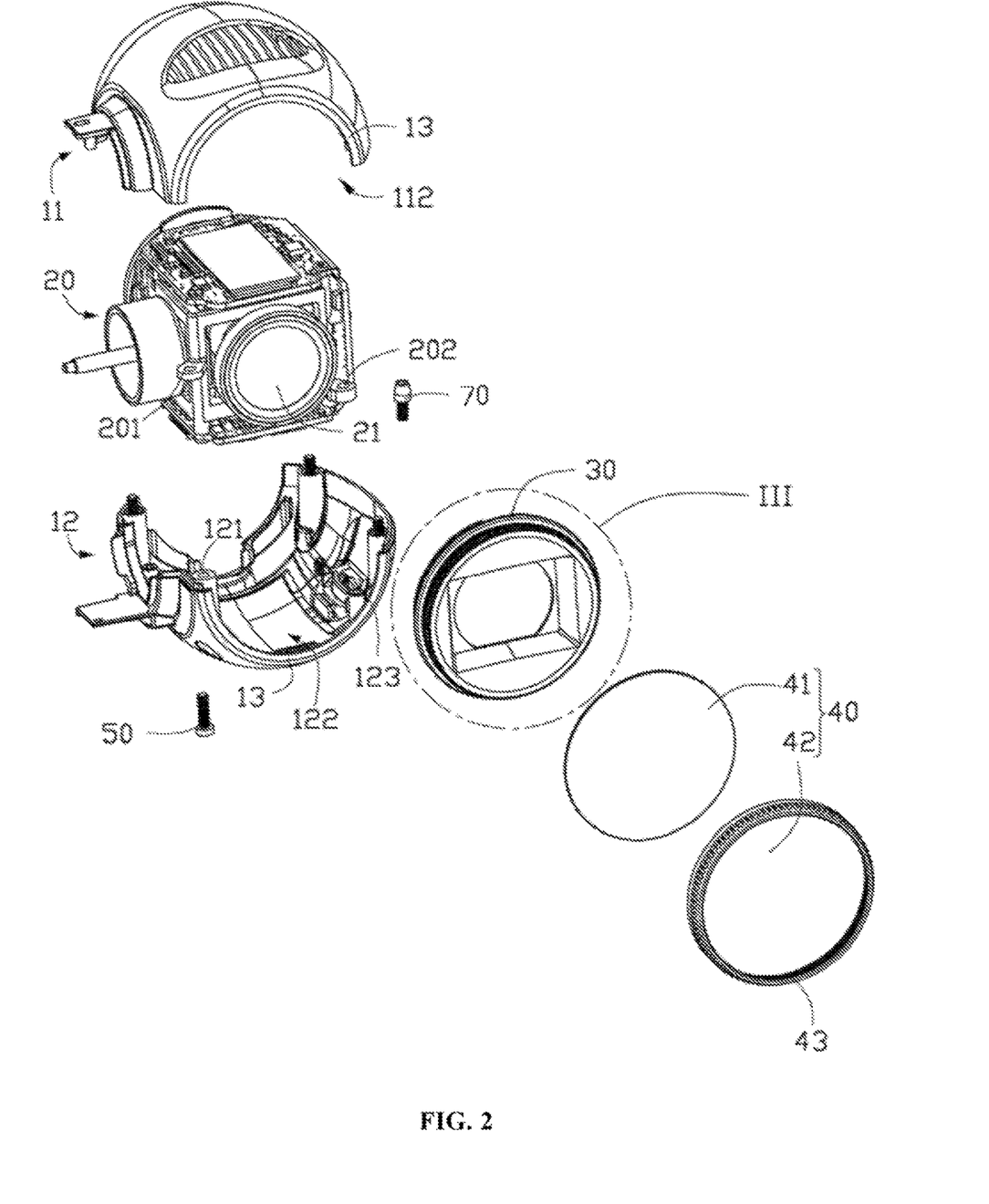
FIG. 2 is an exploded structural schematic diagram of the image capturing module in FIG. 1.

Referring to FIG. 1 and FIG. 2, in some embodiments, the image capturing module 100 may be approximately in a spherical shape as a whole. In some other embodiments, the image capturing module 100 may be in another shape, such as a cubic shape or a cuboid shape.

The image capturing module 100 may comprise an upper casing 11, a lower casing 12, a lens component 20, a lens shade 30, and a filter component 40. In some embodiments, the lens component 20 may be received within a receiving cavity (not shown) formed between the upper casing 11 and the lower casing 12. The filter component 40 may comprise a filter 41 and a filter ring 42. The lens component 20 may comprise a lens 21 via which light may enter the lens component 20 to form images. The lens shade 30 may be disposed between the lens 21 of the lens component 20 and the filter component 40.

The upper casing 11 and the lower casing 12 may each be a hollow casing in an approximately semi-spherical shape, and may be fixed to each other by screw(s), snap(s), glue, or the like. The lens component 20 may be disposed fixedly within a receiving cavity formed between the upper casing 11 and the lower casing 12. The lens component 20 may be fixed with the upper casing 11, or with the lower casing 12, or with both the upper casing 11 and the lower casing 12.

In some embodiments, each of the upper casing 11, the lower casing 12, and the lens component 20 may be provided with a corresponding threaded hole. The upper casing 11, the lens component 20, and the lower casing 12 may be fixed with one another through screw(s). During assembly, the lens component 20 may be first locked on the lower casing 12, then the upper casing 11, the lower casing 12, and the lens component 20 may be fixed with one another, so as to complete the assembly of the upper casing 11, the lower casing 12, and the lens component 20. Specifically, the lower casing 12 may be provided with at least one first threaded hole 121 and at least one third threaded hole 123. The lens component 20 may be provided with at least one second threaded hole 201 in one-to-one correspondence with the first threaded hole 121 and at least one fourth threaded hole 202 corresponding to the third threaded hole 123. The upper casing 11 may be provided with at least one fifth threaded hole (not shown) corresponding to the first threaded hole 121. During assembly, first a screw 70 may be inserted through the fourth threaded hole 202 on the lens component 20 and the third threaded hole 123 on the lower casing 12 in sequence, to fix the lens component 20 and the lower casing 12 together. Then a screw 50 may be inserted through the first threaded hole 121 on the lower casing 12, the second threaded hole 201 on the lens component 20, and the fifth threaded hole on the upper casing 11 in sequence, to fix the upper casing 11, the lens component 20, and the lower casing 12 together.

The upper casing 11 may be further provided with a first opening portion 112 in an approximately semi-circular shape. The lower casing 12 may be provided with a second opening portion 122 corresponding to the first opening portion 112. When the upper casing 11 and the lower casing 12 are connected together, the first opening portion 112 and the second opening portion 122 may constitute a circular opening (not shown) that is in communication with a receiving cavity formed between the upper casing 11 and the lower casing 12, and that is disposed directly facing the lens 21 of the lens component 20. In some other embodiments, the first opening portion 112 and the second opening portion 122 may be in a rectangular or a square shape, so as to form an opening of another shape.

Matching portions 13 may be provided at a position located at the first opening portion 112 on the upper casing 11 and a position at the second opening portion 122 on the lower casing 12. In some embodiments, each of the matching portions 13 may be a semi-circular protruding rib protruding from a bottom surface of the first opening portion 112 or the second opening portion 122.

Figure 3:
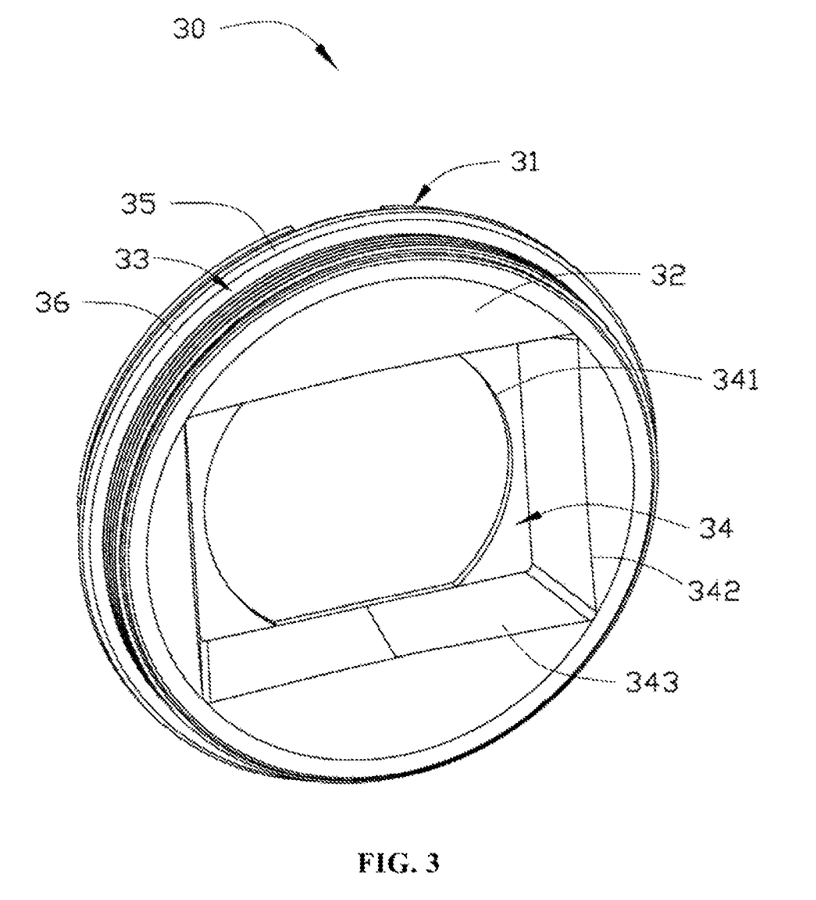
FIG. 3 is a magnified view of portion III of the image capturing module in FIG. 2.

Referring to FIG. 3, the shape of the lens shade 30 may match the shape and size of the opening formed by the first opening portion 112 and the second opening portion 122 when the upper casing 11 and the lower casing 12 are fixed together. The diameter of the lens shade 30 may be slightly less than or equal to the diameter of the opening.

In the some embodiments, the lens shade 30 may be in a discoid shape, and comprise a first bottom surface 31 facing the lens 21, a second bottom surface 32 disposed opposite to the first bottom surface 31, and an outer side surface 33. In some other embodiments, the lens shade 30 may be in a square thin-plate shape or may be a thin plate of another shape.

The lens shade 30 may further comprise a light incoming pathway 34 running through the first bottom surface 31 and the second bottom surface 32 and comprising a first light inlet 341 close to the lens 21 and a second light inlet 342 away from the lens 21. The size of the second light inlet 342 may be greater than the size of the first light inlet 341. In some embodiments, the first light inlet 341 may be substantially in a race-track shape, i.e., the first light inlet 341 may consist of a rectangular portion and semi-circular or arched shapes located on two sides of the rectangular portion, respectively. The second light inlet 342 may be in a rectangular shape. Light may enter the light incoming pathway 34 from the second light inlet 342 and exist from the first light inlet 341, and then enter the lens 21 to form images. In some embodiments, an inner sidewall 343 of the light incoming pathway 34 may comprise slant surfaces. Specifically, four slant surfaces may be formed extending from four lateral sides of the rectangular second light inlet 342 towards the first light inlet 341.

In some other embodiments, the first light inlet 341 and second light inlet 342 may be designed have other shapes, such as circular shapes, as long as the size of the second light inlet 342 is greater than the size of the first light inlet 341.

Figure 4:
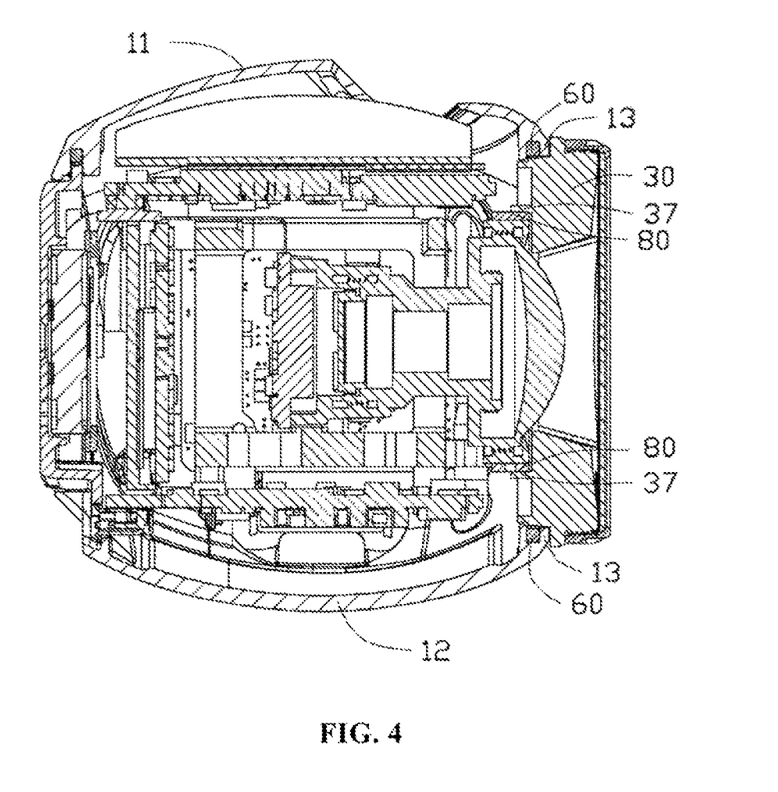
FIG. 4 is a structural schematic diagram of a cross section along line IV-IV in FIG. 1.

Referring to FIG. 3 and FIG. 4, the lens shade 30 may further comprise a snap portion 35 provided on the outer side surface 33 and matching the matching portions 13, so that the lens shade 30 may be fixed with the upper casing 11 and the lower casing 12. In some embodiments, the snap portion 35 may be a snap slot formed on the outer side surface 33 of the lens shade 30. The snap slot may match the semi-circular protruding ribs protruding from the bottom surfaces of the first opening portion 112 and the second opening portion 122. Since the protruding ribs protrude from the bottom surfaces of the first opening portion 112 and the second opening portion 122, when the upper casing 11 and the lower casing 12 are fixed with each other, the protruding ribs may be inserted in the snap slot, i.e., the snap portion 35, to prevent the lens shade 30 from disengaging from the opening, thus achieving a fixation of the lens shade 30 with the upper casing 11 and the lower casing 12.

In some embodiments, an elastic gasket 60 may be disposed between the protruding ribs and the snap slot, for enhancing the sealing of the image capturing module 100, preventing dust and water vapor from entering into the image capturing module 100 through a gap between the lens shade 30 and the upper casing 11 and the lower casing 12.

Referring to FIG. 2 to FIG. 4, the lens shade 30 may further comprise a first connecting portion 36 disposed at a position on the outer side surface 33 that is close to the second bottom surface 32. The filter ring 42 of the filter component 40 may be provided with a second connecting portion 43 corresponding to the first connecting portion 36. The second connecting portion 43 may be connected to the first connecting portion 36 to mount the filter component 40 on the lens shade 30. In some embodiments, the first connecting portion 36 may be an external thread, and the second connecting portion 43 may be a corresponding internal thread. In some other embodiments, the filter component 40 may further be detachably fixed with the lens shade 30 by means of snap or glue.

During the assembly of the image capturing module 100, first the lens component 20 may be fixed with the lower casing 12, then the lens shade 30 may be initially positioned by means of the matching between the snap portion 35 on the lens shade 30 and the matching portion 13 on the lower casing 12. Then, the upper casing 11 may be fixed with the lower casing 12 while allowing the matching portion 13 on the upper casing 11 and the matching portion 13 on the lower casing 12 to position the lens shade 30. Finally, the filter component 40 may be fixed with the lens shade 30 to complete the assembly.

In some other embodiments, the matching portions 13 may be semi-circular snap slots formed by concaving inwardly from the bottom surfaces of the first opening portion 112 and second opening portion 122, respectively, and the snap portion 35 may be an annular protruding rib protruding from the outer side surface 33 of the lens shade 30. Further, a manner of snapping between the matching portions 13 and the snap portion 35 may be not limited to the above-described manner of fixing between a protruding rib and a snap slot. The matching portions 13 and the snap portion 35 may be connected together using another detachable manner, such as a fixing manner using an elastic snap or an elastic reset member and a snap slot. Further, other manners, such as manners using glue or threads, may also be adopted to fix the lens shade 30 with the upper casing 11 and the lower casing 12.

Referring to FIG. 4, an annular retaining wall 37 may be provided on the first bottom surface 31 of the lens shade 30 for matching with the lens 21 of the lens component 20. The annular retaining wall 37 may be disposed perpendicular to the first bottom surface 31. The shape and size of a space (not shown) surrounded by the retaining wall 37 may match the shape and size of the lens 21. In some embodiments, the lens 21 may be in a cylindrical shape, and the retaining wall 37 may correspondingly be in an annular shape. The diameter of the space surrounded by the retaining wall 37 may be equal to or slightly greater than the diameter of the lens 21. During assembly, the lens 21 of the lens component 20 may be arranged within the space surrounded by the retaining wall 37 which is used for limiting the position of the lens 21. In the present embodiment, an elastic gasket 80 of rubber material or another elastic material may be disposed between the retaining wall 37 and the outer side surface of the lens 21.

Figure 5:
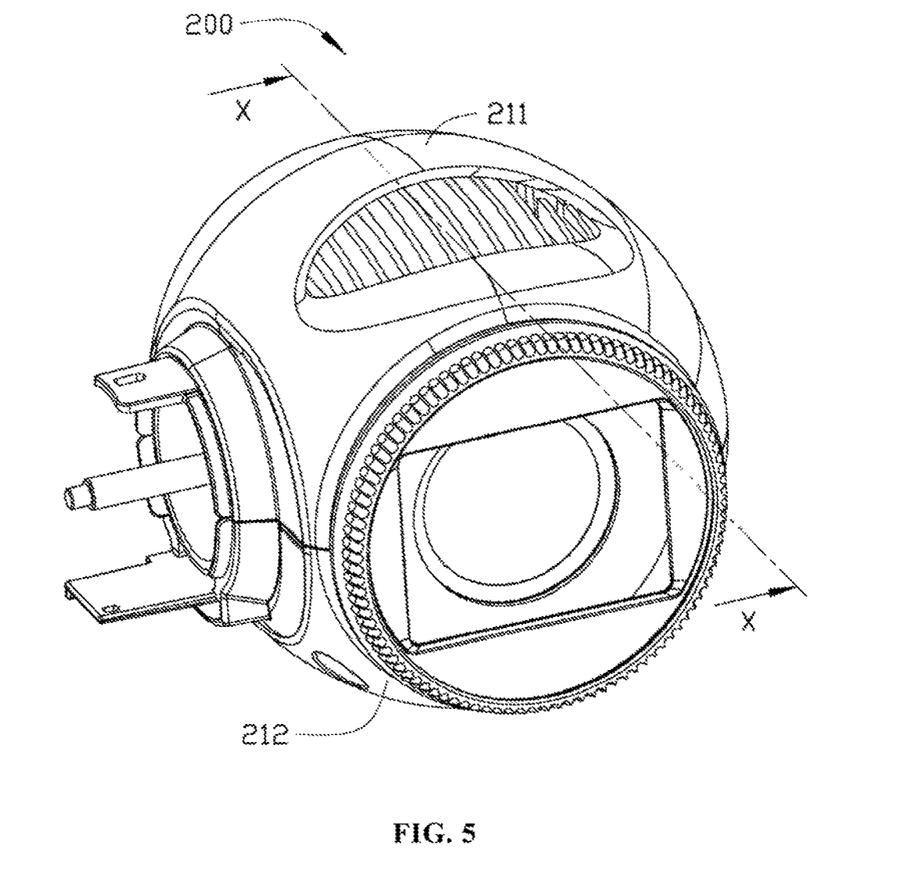
FIG. 5 is a structural schematic diagram of an image capturing module in accordance with another embodiment of the present disclosure.
Figure 6:
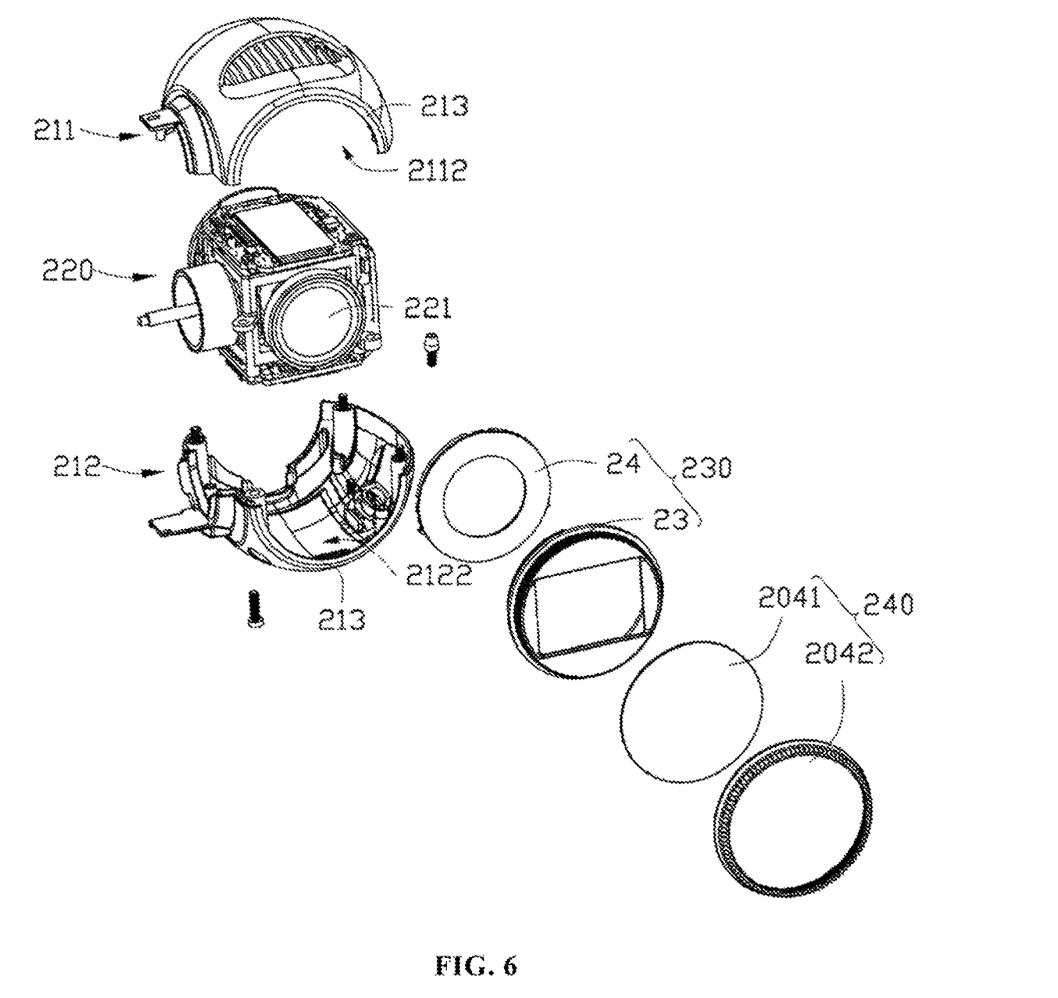
FIG. 6 is an exploded structural schematic diagram of the image capturing module in FIG. 5.

FIG. 5 and FIG. 6 are structural schematic diagram of an image capturing module 200 in accordance with another embodiment of the present disclosure. The structure of the image capturing module 200 may be similar to the structure of the image capturing module 100. The image capturing module 200 may comprise an upper casing 211, a lower casing 212, a lens component 220, a lens shade 230, and a filter component 240. In some embodiments, the lens component 220 may be fixed with the upper casing 211 and the lower casing 212 in a same manner as that described above with respect to the image capturing module 200, and thus detailed description is omitted here. The filter component 240 may comprise a filter 2041 and a filter ring 2042. The lens component 220 may comprise a lens 221 through which light may enter the lens component 220 to form images. The lens shade 230 may be disposed between the lens 221 of the lens component 220 and the filter component 240.

The upper casing 211 may comprise a first opening portion 2112, and the lower casing 212 may be provided with a second opening portion 2122 corresponding to the first opening portion 2112. When the upper casing 211 and the lower casing 212 are fixed together, the first opening portion 2112 and the second opening portion 2122 may form an opening (not labelled) directly facing the lens 221 of the lens component 220. Matching portions 213 may be provided at a position located at the first opening portion 2112 on the upper casing 211 and a position located at the second opening portion 2122 on the lower casing 212, respectively. In some embodiments, the matching portions 213 may be semi-circular protruding ribs protruding from the bottom surfaces of the first opening portion 2112 and the second opening portion 2122, respectively.

The shape of the lens shade 230 may match the shape and size of the opening formed by the first opening portion 2112 and second opening portion 2122. The diameter of the lens shade 230 may be slightly less than or equal to the diameter of the opening.

Figure 7:
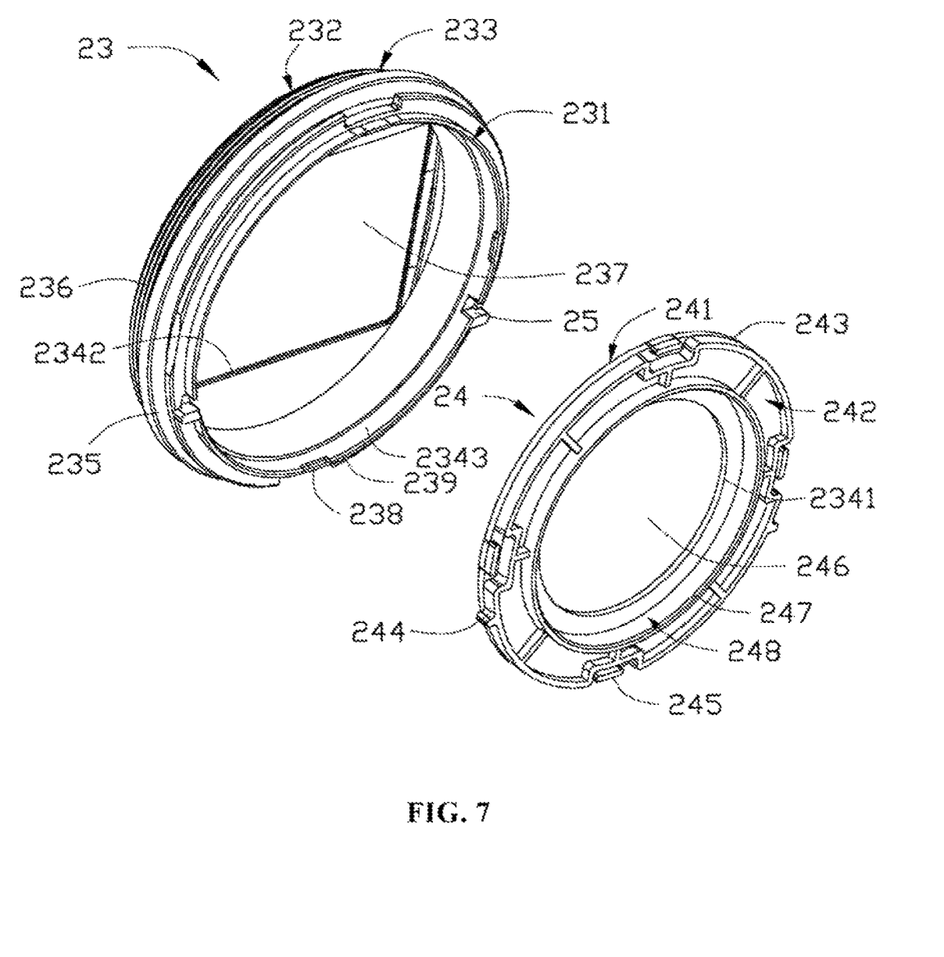
FIG. 7 is an exploded structural schematic diagram of a lens shade of the image capturing module in FIG. 5.
Figure 8:
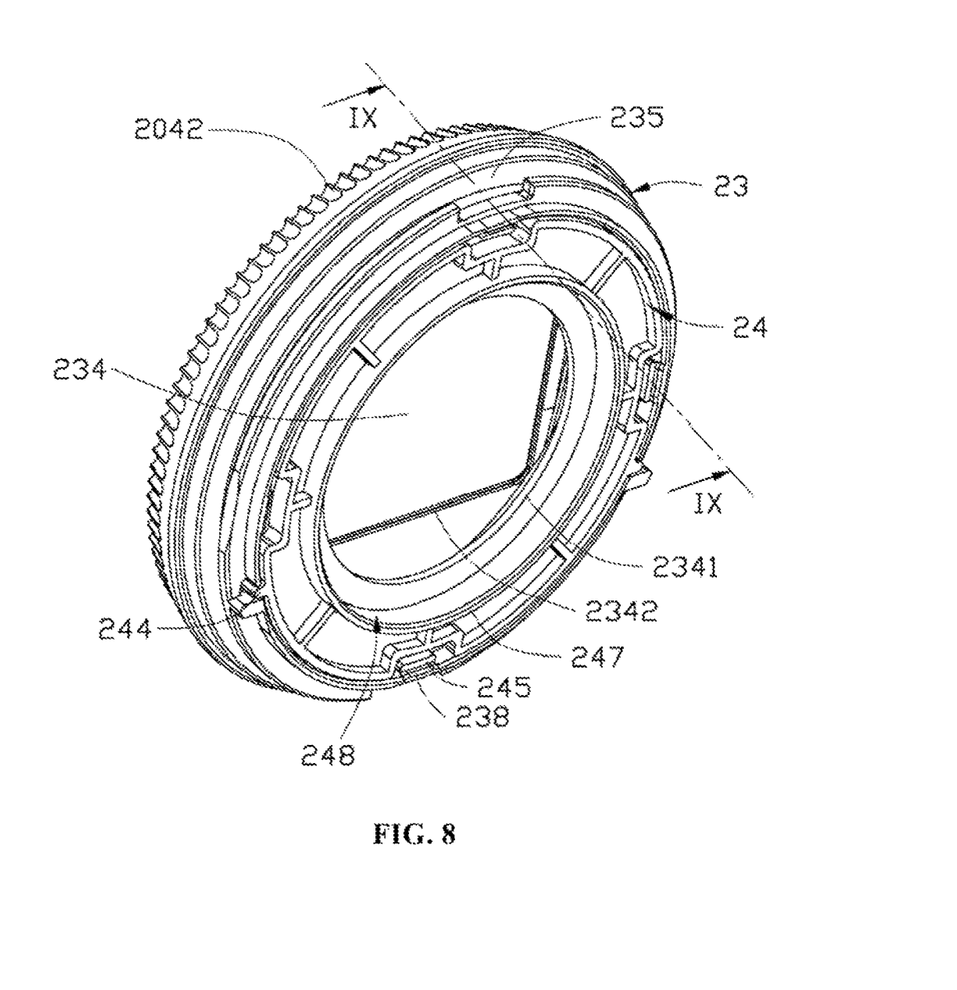
FIG. 8 is an assembly structural schematic diagram of the lens shade and a filter component of the image capturing module in FIG. 5.

Referring to FIG. 7 and FIG. 8, the image capturing module 200 may differ from the image capturing module 100 in that, in the image capturing module 200, the lens shade 230 may comprise a lens shade body 23 and a bottom cover 24.

The bottom cover 24 may comprise a third bottom surface 241 facing the lens shade body 23, a fourth bottom surface 242 disposed opposite to the third bottom surface 241 and facing the lens 221, and an outer sidewall 243. The lens shade body 23 may be approximately in a discoid shape, and comprise a first bottom surface 231 facing the lens 221, a second bottom surface 232 disposed opposite to the first bottom surface 231, and an outer side surface 233.

The lens shade 230 may further comprise a light incoming pathway 234 running through the lens shade body 23 and the bottom cover 24. The light incoming pathway 234 may comprise a first light inlet 2341 formed at the fourth bottom surface 242 of the bottom cover 24, and a second light inlet 2342 formed at the second bottom surface 232 of the lens shade body 23. The first light inlet 2341 and the second light inlet 2342 may each be in communication with the light incoming pathway 234. In some embodiments, the second light inlet 2342 may be in a rectangular shape, and the first light inlet 2341 may be in a circular shape. The size of the second light inlet 2342 is greater than that of the first light inlet 2341.

In some embodiments, a through hole 246 running through the third bottom surface 241 and the fourth bottom surface 242 may be provided on the bottom cover 24. The through hole 246 of the bottom cover 24 may be disposed to directly face the lens 221 and form the first light inlet 2341 at the fourth bottom surface 242. The lens shade body 23 may be a hollow, discoid casing. The light incoming pathway 234 may form the second light inlet 2342 at the second bottom surface 232. The first bottom surface 231 of the lens shade body 23 may be further provided with an opening hole 239. The opening hole 239 may be greater than the second light inlet 2342 in size, and be in communication with the second light inlet 2342. Since the lens shade body 23 is a hollow, discoid casing, a space 237 is formed within and between the opening hole 239 and the second light inlet 2342. The space 237 and the through hole 246 on the bottom cover 24 may collectively form the light incoming pathway 234.

The shape and size of the bottom cover 24 may match the shape and size of the opening hole 239, respectively. The bottom cover 24 may be detachably connected with the second light inlet 2342 of the lens shade body 23.

An inner wall 2343 of the lens shade body 23 may be provided with at least one first positioning portion 25. The outer sidewall 243 of the bottom cover 24 may be provided with at least one second positioning portion 244 matching the first positioning portion 25. In some embodiments, the first positioning portion 25 may be a notch in communication with the opening hole 239. The second positioning portion 244 may be a protruding portion protruding from the outer sidewall 243 of the bottom cover 24. In some other embodiments, a positioning manner between the first positioning portion 25 and the second positioning portion 244 may be not limited to the above-described manner. For example, the first positioning portion 25 may be a protruding portion disposed at a position on the lens shade body 23 close to the opening hole 239, and the second positioning portion 244 may be a notch.

At least one first fastening portion 238 protruding from the inner sidewall 2343 may be provided at a position on the inner sidewall 2343 of the lens shade body 23 close to the opening hole 239, and at least one second fastening portion 245 matching the first fastening portion 238 may be provided on the outer sidewall 243 of the bottom cover 24.

An annular retaining wall 247 disposed perpendicular to the fourth bottom surface 242 may be provided on the fourth bottom surface 242 of the bottom cover 24 facing the lens 221, and used for matching with the lens 221 of the lens component 220. The shape and size of a space 248 surrounded by the retaining wall 247 may be match the shape and size of the lens 221. In some embodiments, the lens 221 may be in a cylindrical shape, and the retaining wall 247 may be correspondingly in an annular shape. The diameter of the space surrounded by the retaining wall 247 may be equal to or slightly greater than the diameter of the lens 221.

Figure 9:
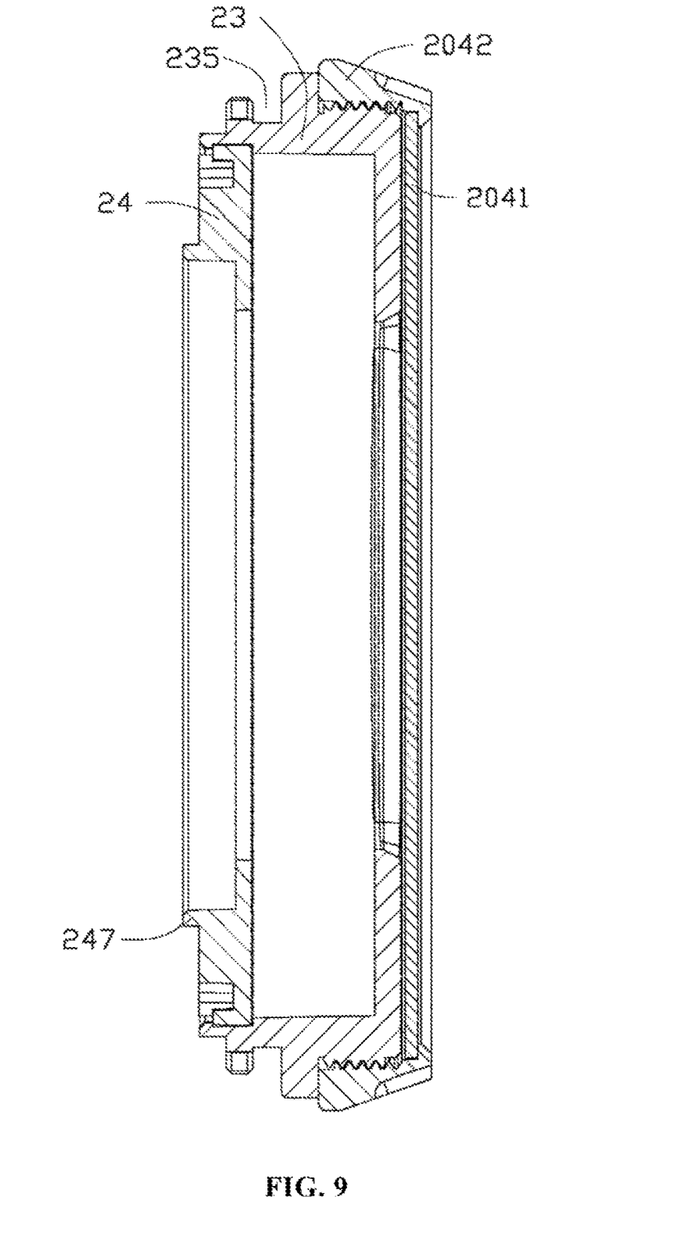
FIG. 9 is a structural schematic diagram of a cross section along line IX-IX in FIG. 8.
Figure 10:
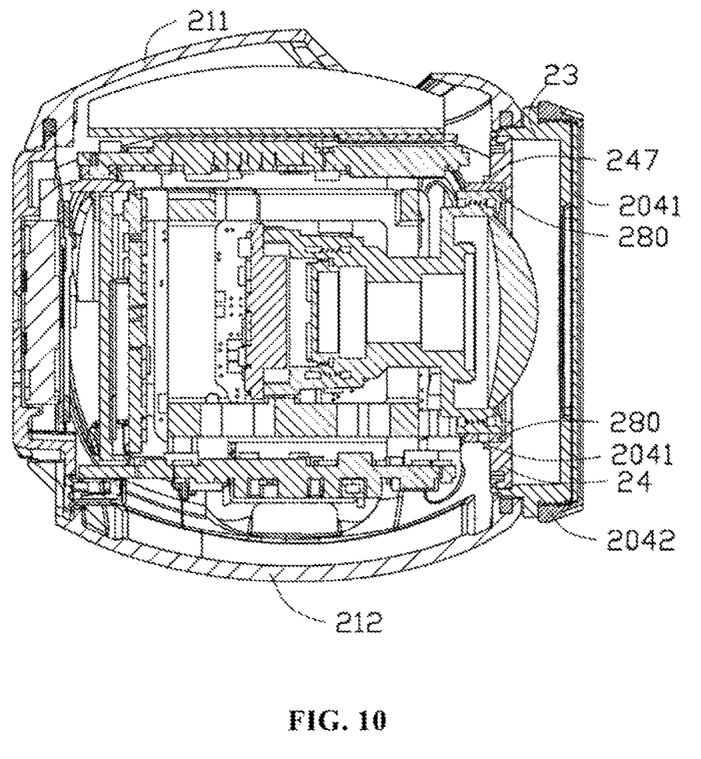
FIG. 10 is a structural schematic diagram of a cross section along line X-X in FIG. 5.

Referring to FIGS. 7, 8 and 9, during the assembly of the lens shade 230, first the second positioning portion 244 on the outer sidewall 243 of the bottom cover 24 may be aligned with the first positioning portion 25 provided at the opening hole 239 of the lens shade body 23. The bottom cover 24 may be pressed towards a side of the lens shade body 23 so that the bottom cover 24 may be partially inserted in the opening hole 239, and the first fastening portion 238 and the second fastening portion 245 may be snapped together, connecting the lens shade body 23 and the bottom cover 24.

In some embodiments, the lens shade body 23 and the bottom cover 24 may each be made of a plastic material, and have a certain elasticity. The first fastening portion 238 may be an elastic arm protruding from a position on the inner sidewall 2343 of the lens shade body 23 close to the opening hole 239, and the second fastening portion 245 may be a stepped surface extending inward from the outer sidewall 243 of the bottom cover 24. During assembly, the bottom cover 24 may be pushed against the first fastening portion 238 from a side close to the bottom cover 24, to elastically deform the first fastening portion 238 and allow the second fastening portion 245 to move to a side of the first fastening portion 238 away from the bottom cover 24. At this time, an external force is removed and the bottom cover 24 may be fixed on the lens shade body 23 due to the limiting of the first fastening portion 238 and the second fastening portion 245. Upon assembly, the lens 221 of the lens component 220 may extend into the space surrounded by the retaining wall 247, which may be used for limiting the lens 221. In some embodiments, an elastic gasket 280 made of a rubber material or another elastic material may be disposed between the retaining wall 247 and the lens 221.

In some other embodiments, the first fastening portion 238 and the second fastening portion 245 may be snapped in another snapping manner, such as a snapping manner using an elastic reset member, e.g., an elastic arm, and a snap slot.

In some other embodiments, the bottom cover 24 may be snapped only with one side of the first bottom surface 231 of the lens shade body 23, without being inserted in the opening hole 239.

Referring to FIG. 6 to FIG. 10, the lens shade body 23 may further comprise a snap portion 235 provided on the outer side surface 233. The snap portion 235 may match with the matching portions 213 to fix the lens shade body 23 with the upper casing 211 and the lower casing 212. The lens shade body 23 may further comprise a first connecting portion 236 provided at a position on the outer side surface 233 close to the second bottom surface 232. A filter ring 2042 of the filter component 240 may be provided with a second connecting portion (not labelled) corresponding to the first connecting portion 236. The second connecting portion on the filter ring 2042 may be connected to the first connecting portion 236 to mount the filter component 240 on the lens shade body 23.

According to the present disclosure, a lens shade is disposed inside an image capturing module and in close proximity to a lens of the image capturing module. As such, the image capturing module can have a small volume and a simple structure, and at the same time a good shading performance. The image capturing module and the lens shade of the image capturing module in accordance with the present disclosure may be applicable to a sport camera device or a miniature camera mounted on an unmanned aerial vehicle for shooting in the air.

In order to enhance the shading effect of the lens shade 30/230, the surface of the lens shade 30/230 may be made to be matte, frosted, or engraved and matted black to reduce light reflection. At the same time a flocking may be made on a surface of the lens shade 30/230 facing the lens, to further reduce reflected light.

The foregoing disclosure is merely illustrative of the embodiments of the disclosure but not intended to limit the scope of the disclosure. Any modifications and variations made to the above-described embodiments within the essential spirit and scope of the disclosure shall all fall into the scope of the disclosure.

What is claimed is:

1. An image capturing module comprising:
    a casing including an upper casing, a lower casing, and an opening, the opening including a matching portion;
    a lens component arranged in the casing and comprising a lens; and
    a lens shade disposed directly facing the lens component and having a thin plate shape, the lens shade being received by the opening of the casing and snapped with the casing and comprising:
        a first bottom surface close to the lens and including a first light inlet, the first bottom surface being arranged inside the casing and being closer to the lens than an inner wall of the casing in a direction along an optical axis of the lens;
        a second bottom surface disposed opposite to the first bottom surface and away from the lens, and including a second light inlet;
        a snap portion matching the matching portion of the opening and configured to fix the lens shade on the casing; and
        a light incoming pathway running through the lens shade to allow external light to enter the lens, the light incoming pathway comprising the first light inlet and the second light inlet, and a size of the second light inlet being greater than a size of the first light inlet,
    wherein:
        the snap portion comprises one of a protruding rib that is at least partially annular and a snap slot, and the matching portion comprises another one of the protruding rib and the snap slot;
        when the upper casing is connected to the lower casing, the protruding rib is snapped with the snap slot; and
        when the upper casing is disconnected from the lower casing, the protruding rib is not snapped with the snap slot.

2. The image capturing module of claim 1, wherein the lens shade has a discoid thin plate shape.

3. The image capturing module of claim 1, wherein the second light inlet has a rectangular or a circular shape.

4. The image capturing module of claim 1, wherein the first light inlet has a circular or a race-track shape.

5. The image capturing module of claim 1, wherein a sidewall of the light incoming pathway comprises a slant surface.

6. The image capturing module of claim 1, wherein the second light inlet has a rectangular shape, and a sidewall of the light incoming pathway comprises four slant surfaces extending from four lateral sides of the second light inlet towards the first light inlet.

7. The image capturing module of claim 1, wherein the lens shade further comprises an annular retaining wall formed on the first bottom surface and being perpendicular to the first bottom, a shape and a size of a space surrounded by the retaining wall matching a shape and a size of the lens, respectively, and the retaining wall being configured to limit a position of the lens.

8. The image capturing module of claim 1, wherein:
    the lens shade comprises a lens shade body and a bottom cover connected to a side of the lens shade body close to the lens,
    the light incoming pathway runs through the lens shade body and the bottom cover,
    the first bottom surface comprises a surface on one end of the bottom cover that faces the lens,
    the lens shade body comprises a first end and a second end, the first end being opposite to the second end and being further away from the lens than the second end, and
    the second bottom surface comprises a surface on the first end of the lens shade body.

9. The image capturing module of claim 8, wherein:
    the lens shade forms a hollow casing,
    a surface on the second end of the lens shade body comprises an opening hole, and
    a size of the opening hole is greater than a size of the second light inlet.

10. The image capturing module of claim 9, wherein:

a shape and a size of the bottom cover match a shape and a size of the opening hole, respectively, the lens shade body comprises a first positioning portion and a first fastening portion formed at the opening hole, the bottom cover comprises a second positioning portion matching the first positioning portion and a second fastening portion matching the first fastening portion, and the first positioning portion and the second positioning portion are configured to match each other to position the bottom cover, and the first fastening portion and the second fastening portion are configured to match each other to connect the bottom cover to the lens shade body.

11. The image capturing module of claim 10, wherein the first fastening portion comprises an elastic arm protruding from a portion on a sidewall of the lens shade body close to the opening hole, and the second fastening portion comprises a snap slot or a stepped surface formed on an outer sidewall of the bottom cover and matching the elastic arm.

12. The image capturing module of claim 10, wherein the first positioning portion comprises a notch disposed at the opening hole, and the second positioning portion comprises a protruding portion protruding from an outer sidewall of the bottom cover and matching the notch.

13. The image capturing module of claim 8, wherein:

the lens shade body comprises a first fastening portion, the bottom cover comprises a second fastening portion matching the first fastening portion, and the first fastening portion and the second fastening portion are configured to match each other to connect the bottom cover to the lens shade body.

14. The image capturing module of claim 13, wherein the first fastening portion comprises an elastic arm protruding from a sidewall of the lens shade body, and the second fastening portion comprises a snap slot or a stepped surface formed on an outer sidewall of the bottom cover and matching the elastic arm.

15. The image capturing module of claim 13, wherein:

the lens shade body comprises a first positioning portion, the bottom cover comprises a second positioning portion matching the first positioning portion, and the first positioning portion and the second positioning portion are configured to match each other to position the bottom cover.

16. The image capturing module of claim 15, wherein the first positioning portion comprises a notch formed on the lens shade body, and the second positioning portion comprises a protruding portion protruding from an outer sidewall of the bottom cover and matching the notch.

17. The image capturing module of claim 1, further comprising:

a filter component connected on the lens shade.

\* \* \* \* \*